UNITED STATES PATENT OFFICE 2,615,917

PROCESS FOR THE MANUFACTURE OF ACETOACETIC ACID AMIDES

Willy Mueller, Riehen, Switzerland, assignor to Ciba Limited, Basel, Switzerland, a Swiss firm No Drawing. Application July 30, 1951, Serial No. 239,405. In Switzerland August 18, 1950

5 Claims. (Cl. 260—561)

It is known that diketene can be reacted with ammonia or a very wide variety of primary and secondary amines to form acetoacetic acid amides, and it is also known that this reaction can be conducted not only in an inert organic solvent but also in water. While, in the reaction of aromatic amines with diketene there is generally no difficulty in isolating the acetoacetic acid amides obtained, in the reaction of ammonia or an aliphatic amine of low molecular weight such as methylamine or ethylamine, there is considerable difficulty in isolating the corresponding acetoacetic acid amide from the resulting aqueous solution, because these amides are generally very soluble and decomposition can easily occur if the dilute solution is evaporated. Moreover, it has been found that the reaction between diketene and a concentrated solution of ammonia leads to the formation of relatively large amounts of undesired by-products, so that it is not possible by this method to synthesize satisfactorily the commercially important acetoacetic acid amide. On the other hand, it would be very desirable to be able to convert diketene, at places where it is produced, by a reaction which can be carried out with ease and safety into an intermediate product which can be transported without danger.

According to this invention acetoacetic acid amides are made by reacting diketene with a salt of carbonic acid with ammonia or a lower aliphatic amine.

The carbonates or bicarbonates used as starting materials in the present process may, for example, be derived from amines of low molecular weight such as methylamine or ethylamine, and especially from ammonia itself. As starting materials there may be mentioned, for example, monoethylamine carbonate, monomethylamine carbonate and ammonium carbonate, and the corresponding bicarbonates, and also commercial mixtures consisting of the carbonate and bicarbonate of one of these bases and which may also contain ammonium carbamate as an impurity.

The reaction can be carried out with advantage in an aqueous medium, for example, in such manner that the ammonium salt is not completely dissolved in the water present at least in the beginning of the reaction. By slowly adding diketene the whole gradually passes into solution with the evolution of carbon dioxide. If desired, further amounts of the ammonium salt and diketene may be introduced into the reaction mixture, and in this manner it is possible to obtain very highly concentrated aqueous solutions of acetoacetic acid amide, for example, solutions of up to 80 per cent. strength, which are stable and owing to their high concentration are hardly more costly to transport than the pure product.

The reaction of diketene with the ammonium salts is advantageously carried out in the cold, for example, at a temperature ranging from about 0° C. to about 30° C., and preferably at about 10° C. to about 15° C.

It is surprising that the present process should be possible, because diketene contains no acid groups which could liberate the base from the ammonium salt. Moreover, it would be supposed that the large excess of carbon dioxide, which must result if the reaction is to proceed at all, especially at the low temperatures favorable for the reaction, would bind the basic constituents very strongly and so prevent any further reaction.

It is also unexpected that by the present process extraordinarily good yields of acetoacetic acid amide should be obtained, which very closely approximate the theoretical yields.

The following examples illustrate the invention the parts and percentages being by weight unless otherwise stated and the relationship of parts by weight to parts by volume being the same as that of the kilogram to the liter:

Example 1

16 parts of ammonium carbonate

[$(NH_4)_2CO_3 + xNH_4.HCO_3 = 26.8$ per cent $NH_3$]

are stirred with 10 parts of water and 21 parts of diketene are introduced dropwise while cooling to 10–15° C. Dissolution becomes complete with the splitting off of carbon dioxide. After 1 hour 16 parts of ammonium carbonate (see above) are added and a further 21 parts of diketene are introduced dropwise. When dissolution is complete, 32 parts of ammonium carbonate are added and a further 42 parts of diketene are introduced dropwise. The whole is stirred until a clear solution is obtained and the odor of diketene has completely disappeared. In this manner there is obtained a clear colorless solution which contains about 100 parts of acetoacetic acid amide in the form of a solution of approximately 80 per cent. strength. The solution has a neutral reaction to litmus and is odorless. It is stable for a long time.

The content of acetoacetic acid amide in the solution is advantageously determined by titration with diazotized para-nitraniline.

Example 2

20 parts of ammonium bicarbonate ($NH_4HCO_3$ = 21 per cent. $NH_3$)

are stirred in 10 parts by volume of water and 21 parts of diketene are introduced dropwise at 10–15° C. To the resulting clear solution are added 20 parts of ammonium bicarbonate and a further 21 parts of diketene are introduced dropwise. When dissolution is complete, a further 40 parts of ammonium bicarbonate are added and 42 parts of diketene are introduced dropwise. The whole is stirred until a clear solution is obtained and the odor of diketene has disappeared. There is obtained a clear colorless solution containing almost the theoretical amount of acetoacetic acid amide.

The resulting solution may be used directly for the manufacture of pyrazolones, for example, as follows:

144.5 parts of phenyl-hydrazine hydrochloride are introduced into the solution in the course of 15 minutes. The mixture warms up to 40–45° C. and dissolution becomes complete. The whole is stirred for 1 hour at 60–65° C., and then 100 parts of hydrochloric acid of 15 per cent. strength are added. Upon cooling, 1-phenyl-3-methyl-5-pyrazolone crystallizes in the form of colorless crystals. The product is separated by filtration, washed with cold water and dried in vacuo. The resulting pyrazolone is pure and melts at 126° C.

Example 3

Carbon dioxide is passed into 155 parts of a monomethylamine solution of 40 per cent. strength at room temperature until Brilliant Yellow paper remains only slightly red. The whole is then cooled with ice to 0° C., and 168 parts of diketene are introduced dropwise while stirring in the course of 1½–2 hours. By cooling care is taken that the temperature does not rise above 10° C. The whole is stirred until the odor of diketene has disappeared and there are obtained about 320 parts of a clear colorless solution containing approximately 70 per cent. of acetoacetic acid monomethylamide. The solution has a neutral reaction and is odorless. Its content of amide is determined by titration with diazotized ortho-anisidine.

Example 4

Carbon dioxide is introduced into 121.6 parts of a monoethylamine solution of 74 per cent. strength at room temperature until Brilliant Yellow paper remains only slightly red. In this manner a thick magma of monoethylamine carbonate is formed. The mixture is then cooled to 0° C., and 168 parts of diketene are introduced dropwise in the course of 1½–2 hours while stirring well. Care is taken by cooling well that the temperature does not rise above 10° C. The whole is stirred until the odor of diketene has disappeared, and then there are obtained about 290 parts of a clear colorless solution containing about 90 per cent. of acetoacetic acid monoethylamide. The amide content of the solution is determined by titration with diazotized ortho-anisidine.

What is claimed is:

1. Process for the manufacture of aceto-acetic acid amides, which comprises reacting at least one molecular proportion of diketene with one molecular proportion of a salt of carbonic acid with a member selected from the group consisting of ammonia, monomethylamine and monoethyl amine.

2. Process for the manufacture of aceto-acetic acid amide, which comprises reacting one molecular proportion of diketene with one molecular proportion of a salt of carbonic acid with ammonia.

3. Process for the manufacture of aceto-acetic acid amide, which comprises reacting in an aqueous medium one molecular proportion of diketene with one molecular proportion of a salt of carbonic acid with ammonia.

4. Process for the manufacture of aceto-acetic acid amide, which comprises reacting in an aqueous medium at a temperature ranging from 0° C. to 30° C. one molecular proportion of diketene with one molecular proportion of a salt of carbonic acid with ammonia.

5. Process for the manufacture of aceto-acetic acid amide, which comprises reacting in an aqueous medium at a temperature ranging from 10° C. to 15° C. one molecular proportion of diketene with one molecular proportion of a salt of carbonic acid with ammonia.

WILLY MUELLER.

REFERENCES CITED

The following references are of record in the file of this patent:

UNITED STATES PATENTS

| Number | Name | Date |
| --- | --- | --- |
| 2,152,132 | Boese | Mar. 28, 1939 |
| 2,174,239 | Gleason | Sept. 26, 1939 |
| 2,561,205 | Jones | July 17, 1951 |